W. N. WHITELEY.
HARVESTER.

No. 172,809. Patented Jan. 25, 1876.

Attest:
E. M. Gallaher.
C. Clarence Poole.

Inventor:
Wm. N. Whiteley
By his atty
R. D. O. Smith.

W. N. WHITELEY.
HARVESTER.

No. 172,809.                              Patented Jan. 25, 1876.

Attest:—
E. M. Gallaher.
C. Clarence Poole.

Inventor
Wm. N. Whiteley
By his atty
R. D. O. Smith

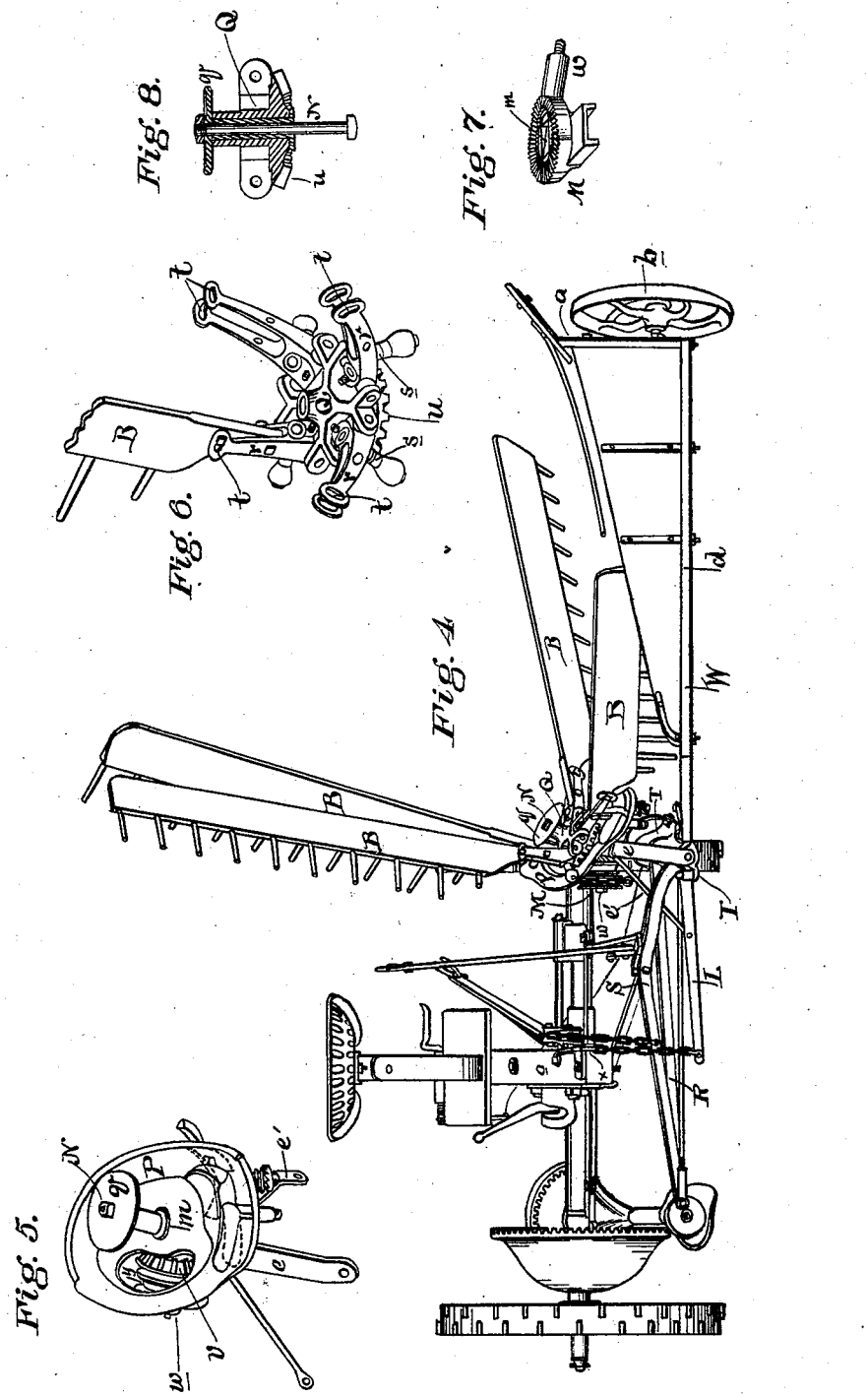

UNITED STATES PATENT OFFICE.

WILLIAM N. WHITELEY, OF SPRINGFIELD, OHIO.

IMPROVEMENT IN HARVESTERS.

Specification forming part of Letters Patent No. 172,809, dated January 25, 1876; application filed May 9, 1874.

*To all whom it may concern:*

Be it known that I, WM. N. WHITELEY, of Springfield, in the county of Clarke and State of Ohio, have invented a new and useful Improvement in Harvesters; and I do hereby declare the following to be a full, clear, and exact description of the same, reference being had to the accompanying drawings, in which—

Figure 1:
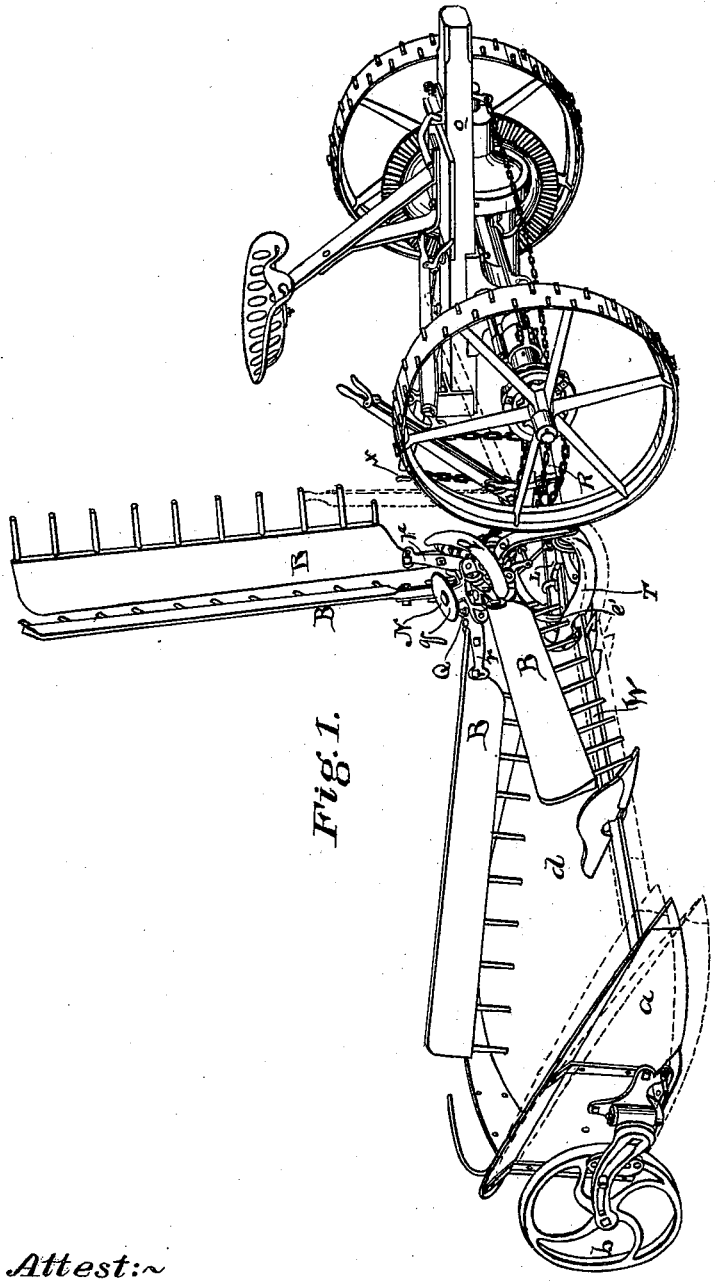
Figure 2:
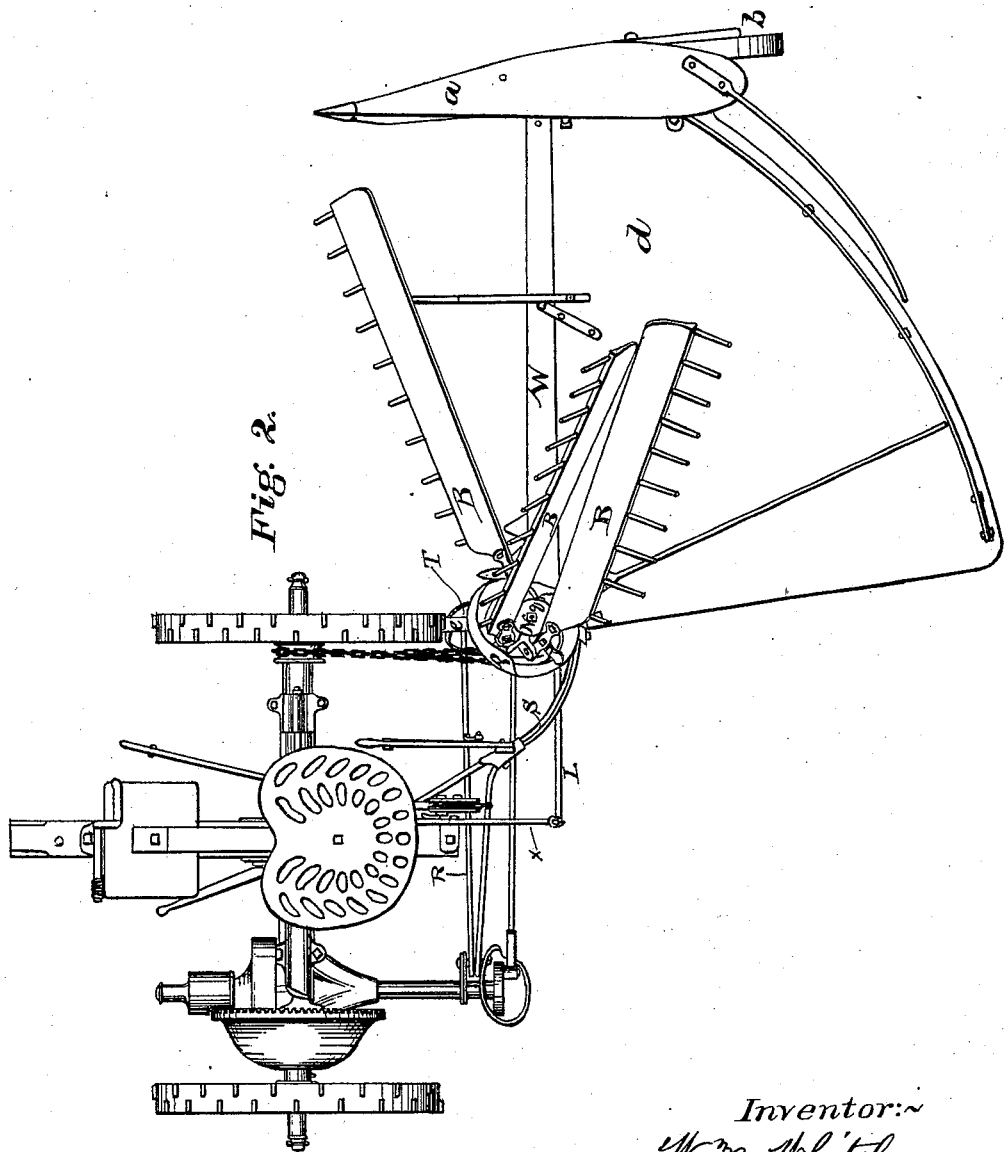
Figure 3:
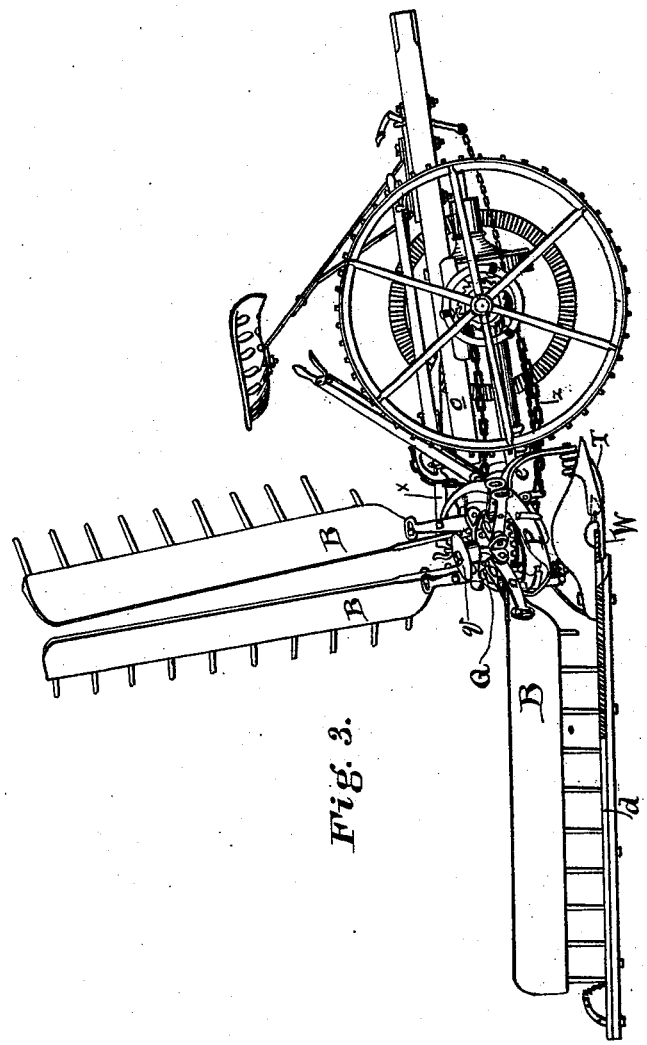

Figure 1 is a perspective view of a reaping-machine with my improvement attached. Fig. 2 is a plan of the same. Fig. 3 is an inner-side elevation of the same. Fig. 4 is a rear elevation of the same. Fig. 5 is a perspective view of the rake-cam detached. Fig. 6 is a perspective view of the revolving rake-head detached. Fig. 7 is a perspective view of the base-plate under the cam. Fig. 8 is a longitudinal section of the revolving head which carries the rakes.

My invention relates to that class of reel-rakes having in combination a series of revolving arms, carrying heads or rakes, which all gather the grain, and a part only of which discharge the grain, and a camway so constructed and arranged as to cause all the heads or beaters to descend to the same gathering level in front of the cutters, and then to elevate those which do not discharge above the cut grain on the platform, and above the level pursued by the discharging head or rake, and known as the "Johnston rake;" and its object is to construct a Johnston rake with driving mechanism capable of operating said rake upon a low-down bridge, so near the level of the platform that the rake-beaters may be attached directly to the short arms or knee-pieces without the intervention of rake-arms, as heretofore, whereby the construction of the apparatus is simplified and rendered less expensive, and the action of the beaters more direct and positive upon the standing grain, whereby all the advantages of the Johnston rake-guide and cam are retained, and its disadvantages are eliminated.

That others may fully understand my improvement I will particularly describe it.

In the drawings my improved rake is shown as attached to a reaping-machine, the cutting apparatus of which is mounted so far in rear of the driving-wheels that the inner shoe runs in the track of the inner driving-wheel; but I do not wish to confine myself to machines of that particular organization.

W is the cutting apparatus, with its platform $d$ and divider $a$ attached in the usual way. The outer end of the cutting apparatus is carried by the grain-wheel $b$. The inner shoe T is attached to the main frame by means of a jointed lateral brace, R, and drag-bar S, so that the cutting apparatus is free to rise and fall with the undulations of the ground over which it moves, independent of the motions of the main frame and driving-wheels.

A lateral arm or brace, L, is firmly secured to the inner shoe, and projects therefrom in a line parallel with the cutter-bar, to a point in rear of the tongue $o$, and is then attached by a chain or other flexible connection to the rear end of the arm or lever X, fixed upon said tongue or main frame, and projecting backward therefrom, to support the inner end of the cutting apparatus upon a point of oscillation between the planes of the driving-wheels.

An arched bridge-plate, $e$, extends from the front to the rear end of the inner shoe T, to support the rake and reel and the cam-guide, and is secured to the shoe by screw-bolts through lugs made thereon for that purpose.

A brace, $e'$, extending from the central part of said bridge down to the lateral arm L on the one side, and to the edge flange of the shoe on the other, connects said bridge laterally to said brace and shoe, and supports the former rigidly in position.

On the central part of the bridge I bolt a flanged base-plate, M, having a lateral arm or spindle, $w$, attached. A part of the upper surface of said plate M is cut with serrations, radiating from an orifice, $m$, through which a clamping-bolt, N, projects, to bind the rake-cam P to said base-plate.

The rake-cam P is constructed (as heretofore set forth) like that used with the Johnston rake—that is to say, the cam P is provided with two tracks upon the side which is toward the platform and cutting apparatus, and a switch, which causes the pendent stud of the knee-piece to pursue one or the other of said tracks as said switch is open or closed, whereby, when said stud traverses the outermost track, the beater will be raised up and pass above the cut grain on the platform, and when said stud traverses the innermost of said tracks the beater will pass close to the platform and sweep the cut grain therefrom.

The bottom of the central plate of the cam P is cut with radial serrations, corresponding to the serrations on the base-plate M, and meshing therewith, so that when the nut is screwed down on the clamping-bolt N the cam and base-plate are firmly bound together.

The cam is provided with a central stud for a bearing or pivot for the revolving head Q, to which the knee-pieces $r$ are hinged, and I sometimes place on top of said pivot, above the revolving head Q, a disk or plate, $q$, which acts as a stop to prevent the rake-beaters from falling over too far away from the cam or guideway while passing along the upper or outer portion of said way, when the said beaters are nearly vertical in position.

The knee-pieces $r$ are provided with pendent studs $s$ for the friction-rollers, in the manner usual with reels of this class. Their outer ends are bifurcated for the reception of the ends of the beater R, and provided with transverse slots $t$ for the ready adjustment of the same. The rake-beaters are thereby made more steady and free from torsion, there being no rake-arm interposed between beaters and the rake-head, as has heretofore been common with Johnston's rakes. They also move in a smaller circle, and with less speed at their outer ends, so that there is less tendency to catch and disarrange the grain as they are raised up.

The lower surface of the revolving head Q is provided with cogs, and forms a bevel-gear, $u$, which meshes with the bevel-pinion $v$, which is placed on the stud $w$. The pinion $v$ is provided with a sprocket-wheel, $y$, over which the driving-chain $z$ passes, whereby motion is transmitted from the main driving-wheel to the rake and reel mechanism.

Having described my improvement, what I claim as new is—

The double-track "Johnston" cam-guide, mounted on a low support or bridge, and having a switch to open or close the inner track, combined with the revolving head and its wheel, short arms or knee-pieces hinged thereto, and provided with short pendent studs, which traverse said guide, and rake-beaters attached directly to said hinged arms, and substantially in line therewith, the whole being operated by mechanism above the plane of the platform, substantially as set forth.

W. N. WHITELEY.

Witnesses:
C. C. POOLE,
R. D. O. SMITH.